(12) United States Patent
Rieman

(10) Patent No.: US 8,411,958 B2
(45) Date of Patent: Apr. 2, 2013

(54) APPARATUS AND METHOD FOR HANDWRITING RECOGNITION

(75) Inventor: John Rieman, Helsinki (FI)

(73) Assignee: Nokia Corporation, Espoo (FI)

( * ) Notice: Subject to any disclaimer, the term of this patent is extended or adjusted under 35 U.S.C. 154(b) by 1068 days.

(21) Appl. No.: 10/838,388

(22) Filed: May 4, 2004

(65) Prior Publication Data

US 2005/0249419 A1     Nov. 10, 2005

(51) Int. Cl.
*G06K 9/00*     (2006.01)
(52) U.S. Cl. ........ 382/187; 382/159; 382/176; 382/186; 382/229; 711/100
(58) Field of Classification Search .................. 382/159, 382/176, 186, 187, 229; 711/100
See application file for complete search history.

(56) References Cited

U.S. PATENT DOCUMENTS

| 5,151,950 A | 9/1992 | Hullender |
| 5,343,537 A * | 8/1994 | Bellegarda et al. ........... 382/186 |
| 5,347,295 A | 9/1994 | Agulnick et al. |
| 2003/0016873 A1 * | 1/2003 | Nagel et al. .................. 382/228 |
| 2004/0017946 A1 | 1/2004 | Longe et al. ................ 382/185 |
| 2004/0037470 A1 | 2/2004 | Simske |

FOREIGN PATENT DOCUMENTS

| EP | 0 686 291 | 10/2001 |
| WO | 9733249 A | 9/1997 |

OTHER PUBLICATIONS

Written Opinion of the International Searching Authority, Dated Nov. 16, 2006.

* cited by examiner

*Primary Examiner* — Chan S Park
*Assistant Examiner* — Eueng-Nan Yeh
(74) *Attorney, Agent, or Firm* — Alston & Bird LLP

(57) ABSTRACT

A method and device is provided for recognizing characters in a handwritten input representing an input character string. A character sub-string preceding an unrecognized character in the input character string is determined. Handwriting recognition is used to provide one or more candidate characters for the unrecognized character. One of the one or more candidate characters is then selected. The candidate character selected, is the one which is most likely to be a correct recognition of the unrecognized character based on the determined character sub-string.

18 Claims, 2 Drawing Sheets

APPARATUS AND METHOD FOR HANDWRITING RECOGNITION

FIELD OF THE INVENTION

The invention generally relates to handwriting input to electronic devices, and more specifically to a method and a device for handwriting recognition.

BACKGROUND OF THE INVENTION

The use of handwriting input in electronic devices poses a set of problems, e.g. due to the fact that handwriting is individual and the fact that it is sometimes difficult to distinguish different handwritten characters from each other. Different systems have been developed for the purpose of facilitating input of characters into electronic devices by means of handwriting instead of typing on keyboards, key pads and the like.

In efforts to increase the handwriting recognition accuracy, different ways to distinguish different characters have been suggested. For example, some systems require the user to write characters in a special way, and other include means which are able to "learn" the handwriting of individual users.

Handwriting recognition may also take into consideration information regarding the context in which characters occur.

The US application with publication no. U.S. 2004/0017946 discloses a handwritten Chinese character input method and system including a list of probable Chinese characters which is based on the key strokes input. As more key strokes are input, the list of Chinese character is adjusted and when the desired Chinese character appears in the list, the user can pick the character by means of a selection movement, such as a mouse or stylus or finger tapping.

The European patent EP 0 686 291 discloses a method of handwriting recognition which uses a dictionary for recognizing an input handwritten word. Candidate characters are identified for each character of the input handwritten word and combinations of the candidate characters are compared with entries in the dictionary to provide candidate words that might represent the input. Furthermore, a most likely character string is identified as a combination of candidate characters that has a highest combined likelihood of being correct without regard to the dictionary. A list is the provided comprising the candidate words and the most likely character string if it is not one of the candidate words.

The recognition of words by means of combination of different candidate characters requires a large amount of processing and a very large dictionary. Hence there exists a need for handwriting recognition which alleviates these drawbacks whilst still maintaining good recognition accuracy.

SUMMARY OF THE INVENTION

A method is provided for recognizing characters in a handwritten input representing an input character string. According to the method a character sub-string preceding an unrecognized character in the input character string is determined. Handwriting recognition is used to provide one or more candidate characters for the unrecognized character. One of the one or more candidate characters is then selected. The candidate character selected, is the one which is most likely to be a correct recognition of the unrecognized character based on the determined character sub-string.

Hence, according to the method, characters are recognized one at the time. The recognition of a character is based on handwriting recognition to provide candidate characters and on an already recognized character sub-string preceding the character to be recognized.

By limiting the recognition to one character at the time, i.e. not taking into account different combinations of candidate characters form more than one character at the time, the amount of processing is reduced. At the same time, accuracy is achieved by means of the consideration taken to the determined character sub-string preceding the unrecognized character.

One way of using the determined character sub-string for selecting one of the one or more candidate character, is to further include the use of stored character strings. One or more candidate character strings may then be identified amongst the stored character strings, where the candidate character strings each comprises an initial character sub-string identical to the determined character sub-string. The selection may be based on the one or more candidate character strings. The selection may more specifically be based on a next character succeeding the initial character sub-string of each of the one or more candidate character strings.

The method may be performed for a single character only using other methods for handwriting recognition for other characters of a character string. The method may also be performed sequentially for one character at the time for a character string.

A device is provided for recognizing characters in a handwritten input representing an input character string. In the device a processor is arranged to determine a character sub-string preceding an unrecognized character in the input character string. The processor is further arranged to use handwriting recognition to provide one or more candidate characters for the unrecognized character. The processor is also arranged to select one of the one or more candidate characters, where the candidate character selected is the one which is most likely to be a correct recognition of the unrecognized character based on the determined character sub-string.

BRIEF DESCRIPTION OF THE DRAWINGS

In the following, the present invention is illustrated by way of example and not limitation with reference to the accompanying drawings, in which.

DETAILED DESCRIPTION OF THE INVENTION

Figure 1:
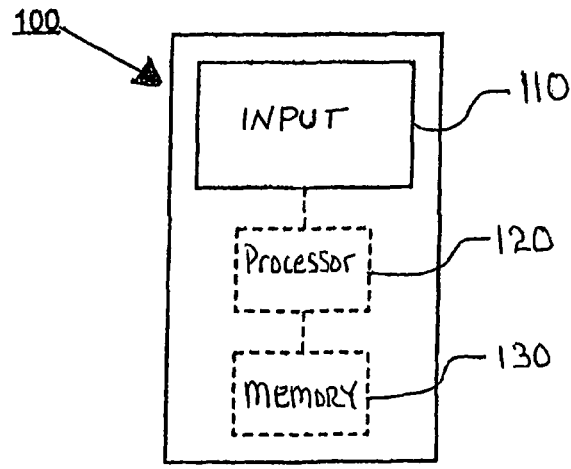
FIG. 1 shows a schematic block diagram of a device in which an embodiment of a device according to the invention is implemented.

FIG. 1 shows a schematic block diagram of a device 100 in which an embodiment of a device according to the invention is implemented. The device 100 may for example be a handheld device, such as a mobile phone, a personal digital assistant etc., or any device where handwritten input is or should be facilitated.

The device 100 includes handwriting input means 110. It is to be noted that any way of and the means for giving handwritten input may be used according to the invention, such as a pressure sensitive screen on which a user may give handwritten input by means of a stylus. Such ways and means are well known within the art and hence, no further description will be provided here.

The device 100 further includes a processor 120 which is operatively connected to the handwriting input means 110. The devices in which the invention may be implemented generally comprise one or more microprocessors or other devices for digital processing. Furthermore, the devices in which embodiments of the invention may be implemented generally comprise a platform for implementing different computational methods to be performed by the existing devices for digital processing. Hence, one of the existing processors is preferably but not necessarily used as the processor 120 and the steps of embodiments of the method according to the invention to be performed by the processor 120, are readily implemented by a skilled person given knowledge of prior art devices and the teachings herein.

The device 100 further comprises a memory 130 for storing character strings. The memory is operatively connected to the processor 120. As is the case for the processor 120, the devices in which the invention may be implemented generally comprise one or more memories or other devices for digital storage. Furthermore, some devices may even include a dictionary. Hence, such an existing memory is preferably but not necessarily used as the memory 130. The steps of the method of the invention for the processor to access the memory with respect to stored character strings, are readily implemented by a skilled person given knowledge of prior art devices and the teachings herein.

Should the device in which an embodiment of the invention is to be implemented not comprise such a processing device, platform, memory, etc. they are readily included as they are well known within the art.

Although the device 100 described above relates to input of handwritten strings of characters directly to an electronic device by means of pressure sensitive screen and the like, it is to be noted that embodiments of the invention may also be used in other applications where character recognition is used, such as in optical character recognition methods for handwritten messages on paper and the like.

Figure 2:
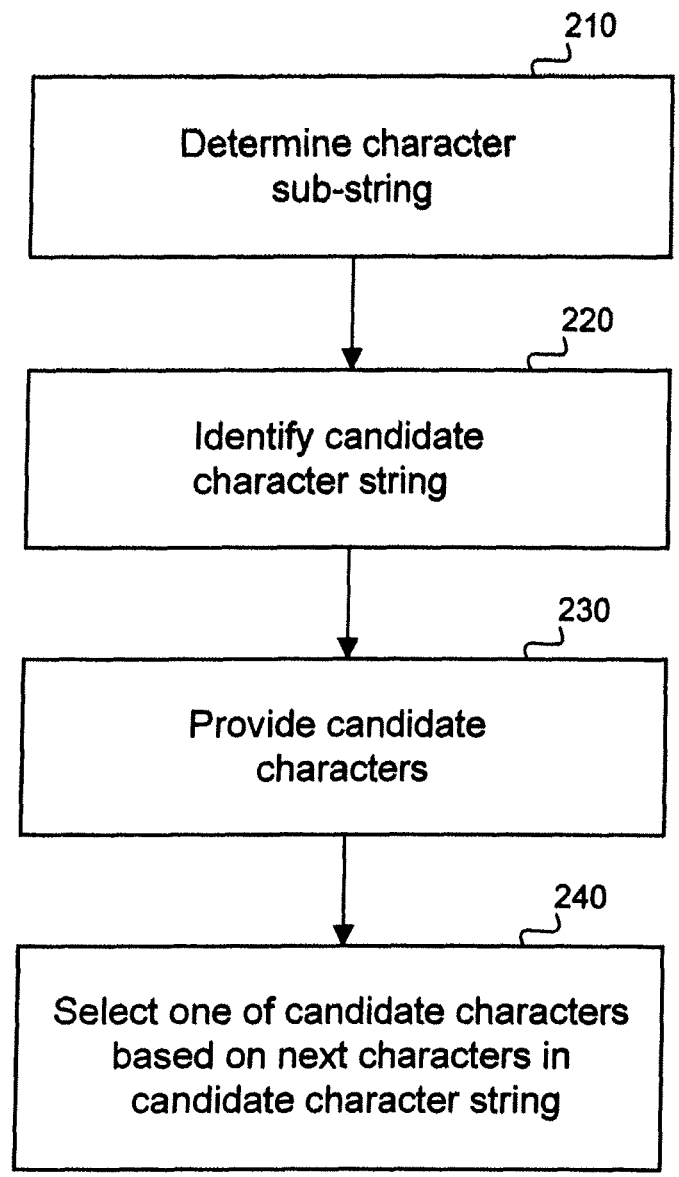
FIG. 2 shows a flow chart of an embodiment of a method according to the invention.

FIG. 2 shows a flow chart of an embodiment of a method according to the invention. A handwritten input has been given to an electronic device, e.g. to a device of the type illustrated in FIG. 1 and described in reference thereto. The handwritten input represents an input character string, i.e. a string of alphabet letters, numerals, signs etc. or a combination thereof. The characters of the handwritten input preceding (i.e. up to and including the character just before) a character to be recognized (unrecognized character in the following), have been recognized by means of a method of handwriting recognition including but not limited to the method according to the present embodiment.

In a step 210 a character sub-string of the input character string is determined. The character sub-string can either consist of all characters preceding the unrecognized character in the input character string represented by the handwriting input, or it can consist of a terminal character sub-string of the characters preceding the unrecognized character. A terminal character sub-string of a character string is in this respect a character string starting from a character succeeding the first character of the character string or a later character and ending with the last character of the character string.

The determining of the character sub-string to be used may be done based on stored character strings. The stored character strings at least include a set of frequently occurring words, but preferably also include phrases, and frequently occurring word stubs and character sequences in the language of interest, such as "tion", "ly" etc.

In some cases where the complete character string preceding the unrecognized character in the input character string is identical to one of the stored character strings or an initial sub-string of one or more stored character strings, the determined character sub-string will be the complete character string preceding the unrecognized character. In other words, as long as the characters recognized so far in an input character string, indicate that a phrase, word or character sequence present amongst the stored character strings has been input, all previous characters are used as basis for recognizing a subsequent character. An initial character sub-string of a character string is in this respect a character string starting from the first character of a character string and ending before the last character of the character string.

In other cases where the complete character string preceding the unrecognized character in the input character string is not identical to any stored character string or an initial sub-string of any stored character string, the determined character sub-string will not be the complete character string. In such cases the first character of the characters recognized so far in a input character string, which indicates that a phrase, word or character sequence which is not present amongst the stored character strings has been input, will be used as the first character of the determined character sub-string. More specifically, any initial character sub-string of the input character string preceding the unrecognized character will be identified, which is identical to one of the stored character strings or to an initial character sub-string of one of the stored character strings, and which together with a succeeding character is not identical to any one of the stored character strings or to an initial character sub-string of any one of the stored character strings. The determined character sub-string will then start with the succeeding character and end with the character preceding the unrecognized character.

When applying the invention to specific languages, the determining of a character sub-string may be further specified, e.g. in order to reduce computational complexity. In an alternative to allowing the method to take into account all preceding characters when recognizing an unrecognized character, the determining can be specified to only take into account the previous characters of a word to which the unrecognized character belongs. In such an alternative, the determining of the character sub-string includes the identification word separating characters or indications, such as space characters. The previous characters of the word to which the unrecognized character belongs are then readily identified as the characters of the input character string following a last space character or other word separating indications before the unrecognized character. If the word is the first word in the input character string following all characters preceding the unrecognized character will be identified as the character sub-string.

Other alternatives of determining sub-strings are possible, such as the determining of a sub-string consisting of previous characters of the word to which the unrecognized character belongs and characters of complete words preceding the unrecognized character. The words are readily identified by means of word separating characters or indications such as space characters.

After determining the character sub-string in step 210, one or more candidate character strings are identified in step 220. The candidate character strings are identified amongst stored character strings as any stored character string comprising an initial character sub-string identical to the determined character sub-string. Any approaches for matching of character strings with stored character strings, and means for implementing such approaches may be used including those well known within the art.

It is to be noted that although the use of lookup amongst stored character string has been disclosed above, any other way of predicting a next character based on a given character string may be used, such as lookup amongst stored probabilities of the probability for a given character to succeed a given character string.

In step 230 one or more candidate characters for an unrecognized character is provided. The candidate characters are provided by means of handwriting recognition. Any type of handwriting recognition may be used to provide the candidate characters, such as handwriting recognition known within the art.

Finally, in step 240 one of the one or more candidate characters is selected. The candidate character is selected which is most likely to be a correct recognition of the unrecognized character. The likelihood of a candidate character is based on a next character succeeding the initial character sub-string of each of the one or more candidate character strings.

In alternative to using the next character succeeding the initial character sub-string of each of the one or more candidate character strings any method of providing probabilities that a given character is to succeed a given character string may be used.

It is to be noted that even if the embodiment of the invention described above with reference to FIG. 2 is applied for a single character given the fact that the preceding characters have been recognized, the method may be used sequentially to recognize all characters one at the time based on the previously recognized characters. In this case all steps in the determining of the character sub-string will not have to be repeated for each character but the information from the determination of a character sub-string for the previous character may be used in the determination of the character sub-string relevant for the current character to be recognized. This will be more apparent from the description below with reference to FIG. 3A-C.

Figure 3A:
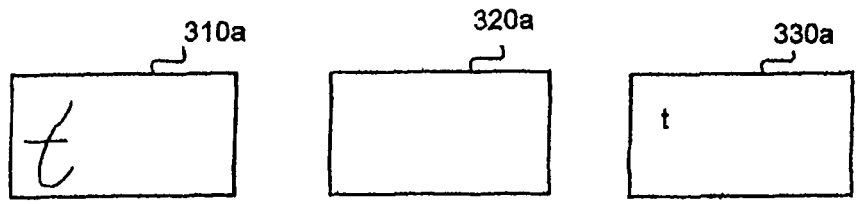
FIG. 3A-C illustrates the recognition of a handwritten word in accordance with the invention.
Figure 3B:
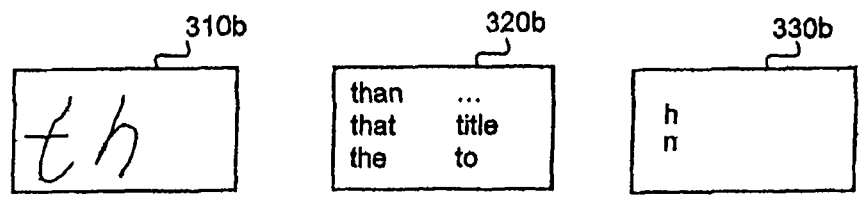
Figure 3C:
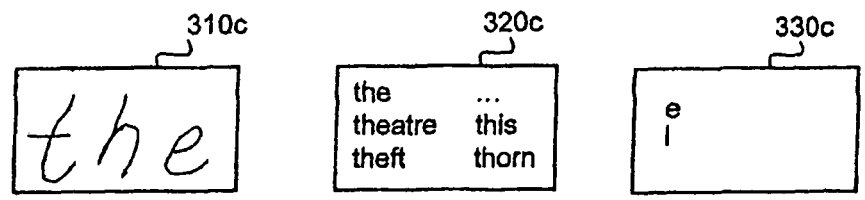

FIGS. 3A-C illustrates the recognition of a handwritten word in accordance with the invention. Boxes 310a-c includes the input handwritten word, 330a-c includes candidate characters for the handwritten characters of boxes 310a-c, and boxes 320a-c includes candidate strings in alphabetical order identified amongst the stored character strings.

Even if in the following the characters of the handwritten input are recognized one at the time as they are input to a device, the recognition may just as well be done sequentially one at the time after all characters have been input.

In FIG. 3A a handwritten, unrecognized character has been input as indicated in box 310a, and the only candidate characters provided by means of handwriting recognition is "t" as indicated in box 330a. Hence, the character "t" is selected as the most probable recognition of the handwritten character in box 310a.

In FIG. 3B a second handwritten, unrecognized character has been input as indicated in box 310b. The determined character sub-string is "t" in this case. Based on the determined character sub-string a number of candidate character strings are identified in box 320b, such as "than", "that", "the", . . . , "title", and "to". Any candidate character string starting with "tn" would have appeared between "title" and "to" since the candidate character strings appear in alphabetical order. Both the character "h" and the character "n" are provided as candidate characters in box 330b by means of handwriting recognition. As there are no candidate character strings having an "n" as a next character after the sub-string "t" amongst the candidate character strings and at least three candidate character strings having an "h" as a next character after the sub-string "t" amongst the candidate character strings, "h" is selected as the most probable recognition of the second handwritten character in box 310b.

In FIG. 3C a third handwritten, unrecognized character has been input as indicated in box 310c. The determined character sub-string is "th" in this case. Based on the determined character sub-string a number of candidate character strings are identified in box 320c, such as "the", "theatre", "theft", . . . , "this", and "thorn". Any candidate character string starting with "thl" would have appeared between "this" and "thorn" as the candidate character strings appear in alphabetical order. Both the character "e" and the character "l" are provided as candidate characters in box 330c by means of handwriting recognition. As there are no candidate character strings having an "l" as a next character after the sub-string "th" amongst the candidate character strings and at least three candidate character strings having an "e" as a next character after the sub-string "th" amongst the candidate character strings, "e" is selected as the most probable recognition of the second handwritten character in box 310c.

In the example described with reference to FIGS. 3A-C, the determined character string is always the complete character string preceding the unrecognized character, since the character string is always identical to one of the stored character strings or an initial character sub-string of one or more of the stored character strings. If the handwritten word instead would have been "salsa", and this word or any word having "sals" as an initial character sub-string was not amongst the stored character strings, whereas the word "sale" was, the following approach may be used. Up until and including the second "s" as unrecognized character, the complete character string preceding the unrecognized character would be used as the determined sub-character string. For the second "s" as unrecognized character, no candidate character strings will be identified and the selection of one of the one or more candidate character will be based on the handwriting recognition. Alternatively another approach may be used where the selection is also based on the previous single character in this situation. For the first "a" in the word "salsa", as unrecognized character, "sal" is identical to the initial character sub-string "sal" of the stored character string "sale", and is together with a succeeding character "s" is not identical to any one of the stored character strings or to an initial character sub-string of any one of the stored character strings. The determined character sub-string will then start with the succeeding character "s" and end with the character preceding the unrecognized character, which in this case is "s" as well. Should for example the candidate characters in this case have been "a" and "d" from the handwriting recognition, a number of candidate character strings would be identified having "sa" as an initial character sub-string, such as "sale", but probably no one having "sd" as an initial character sub-string. Hence, the character "a" would be selected as the most probable recognition of the handwritten character. A similar approach may be used for words such as "schoolboy" in the case where the word "schoolboy" is not one of the stored character strings, whereas "school" and "boy" is or other character strings having an initial character sub-string starting with "school" or "boy".

Although the examples above are given for the English language the invention it will be readily apparent for the skilled person how to apply the invention to handwriting recognition in other languages using the Latin alphabet, Cyrillic alphabet etc.

The invention may also be applied for handwriting recognition for languages, such as Chinese, where characters represent a syllable and each word consists of one or more characters.

In written Chinese, words may be a single character or they may be two or more characters. For example, the word for "Beijing" has two characters, one representing each syllable of the word. Common phrases may be composed of several characters. Dictionaries list characters, words, and phrases. Versions of these dictionaries may be stored electronically in computers or other mobile devices.

Chinese text can be entered into a computer or mobile device by drawing each character on a touch-sensitive surface. Some characters are distinguished only by small differences, and it may sometimes be difficult for the system to determine which of two or more similar characters is intended.

The proposed invention can improve recognition of ambiguous Chinese characters in a manner similar to that described for other languages. When the system cannot distinguish a character, it can identify a sub-string consisting of some or all of the characters that have been entered preceding the current unrecognized character. It can use stored information about common words and phrases to determine likely candidates that would follow the sub-string. It can use that result to select among the candidates proposed by the handwriting recognition system.

As written text in languages as Chinese does not indicate separation between words by means of space characters as is done in written text in languages as English, the determining of a character sub-string in recognition of Chinese handwritten characters cannot make use of space characters solely in order to identify word separation. Instead, the use of previous characters and comparison with stored information about common words and phrases as disclosed above with reference to FIG. 2 may be applied to determine a character sub-string. The determination of a character sub-string may also be iterative, e.g. a sub-string consisting of one character is used first, then a sub-string consisting of two characters, etc. Alternatively, the user may indicate in some way the separation between words when entering handwritten characters, and such an indication can be used in a way which is analogue to the way the space characters are used above as disclosed with reference to FIG. 2.

The invention claimed is:

1. A method comprising:
   receiving a handwritten input character string having an unrecognized character;
   determining at least one character sub-string preceding the unrecognized character in the input character string;
   providing, by means of handwriting recognition, one or more candidate characters for the unrecognized character;
   identifying, amongst stored character strings, one or more character strings comprising an initial character sub-string identical to the determined character sub-string; and
   selecting, based on the identified one or more character strings, one of the one or more candidate characters that is most likely to be a correct recognition of the unrecognized character,
   wherein if a complete character string preceding the unrecognized character in the input character string is not identical to any stored character string or an initial sub-string of any stored character string, determining at least one character sub-string comprises:
   identifying any initial character sub-string of the input character string preceding the unrecognized character, which is identical to one of the stored character strings or to an initial character sub-string of one or more of the stored character strings, and which together with a succeeding character is not identical to any one of the stored character strings or to an initial character sub-string of any one of the stored character strings; and
   determining a character sub-string consisting of a terminal character sub-string of the input character string preceding the unrecognized character and succeeding any identified initial character sub-string;
   else determining at least one character sub-string comprises:
   determining a character sub-string consisting of said complete character string preceding the unrecognized character in the input character string.

2. The method of claim 1, wherein the one of the one or more candidate characters is selected which has the highest probability to succeed the character sub-string.

3. The method of claim 1, wherein the selecting is further based on a next character succeeding the unrecognized character.

4. The method of claim 1, wherein determining at least one character sub-string further comprises comparing the character sub-string to stored character strings, the stored character strings being chosen from the following type of character strings: phrases, words, word stubs and frequently used character sequences.

5. The method of claim 1, wherein the determining of a character sub-string comprises:
   identifying space characters in the input character string; and
   on basis of a substring directly succeeding a space character and directly preceding the unrecognized character, determining a character sub-string.

6. The method of claim 5, wherein a character sub-string is determined consisting of the terminal character sub-string of the input character string preceding the unrecognized character and succeeding an identified last space character before the unrecognized character.

7. The method of claim 1, further comprising:
   for each character in sequence of the input character string preceding the unrecognized character:
   providing, by means of handwriting recognition, one or more candidate characters for the unrecognized character; and
   selecting, based on the characters preceding the unrecognized character in the input character string, one of the one or more candidate characters which is most likely to be a correct recognition of the unrecognized character.

8. The method of claim 1 wherein recognizing the character sub-string comprises:
   identifying at least one word string in the at least one character sub-string.

9. The method of claim 8 wherein identifying the at least one word string in the at least one character sub-string comprises
   beginning with a character preceding the unrecognized character, comparing the character, and then the character together with each subsequent character, in order, to stored character strings.

10. An apparatus comprising:
    a processor;
    memory including computer program code;
    the memory and the computer program code configured to, with the processor, cause the apparatus to:

receive a handwritten input character string having an unrecognized character;

determine at least one character sub-string preceding the unrecognized character in the input character string;

provide, by means of handwriting recognition, one or more candidate characters for the unrecognized character;

identify, amongst stored character strings, one or more character strings comprising an initial character sub-string identical to the determined character sub-string; and select, based on the identified one or more character strings, one of the one or more candidate characters that is most likely to be a correct recognition of the unrecognized character, wherein if a complete character string preceding the unrecognized character in the input character string is not identical to any stored character string or an initial sub-string of any stored character string, the apparatus is caused to determine at least one character sub-string by:

identifying any initial character sub-string of the input character string preceding the unrecognized character, which is identical to one of the stored character strings or to an initial character sub-string of one or more of the stored character strings, and which together with a succeeding character is not identical to any one of the stored character strings or to an initial character sub-string of any one of the stored character strings; and determining a character sub-string consisting of a terminal character sub-string of the input character string preceding the unrecognized character and succeeding any identified initial character sub-string;

else the apparatus is caused to determine at least one character sub-string by:

determining a character sub-string consisting of said complete character string preceding the unrecognized character in the input character string.

11. The apparatus of claim 10, wherein processor is arranged to select the candidate character is which has the highest probability to succeed the character sub-string.

12. The apparatus of claim 10, wherein the processor is arranged to select, based on a next character succeeding the initial character sub-string of each of the one or more candidate character strings, one of the one or more candidate characters which is most likely to be a correct recognition of the unrecognized character.

13. The apparatus of claim 10, wherein the processor is further arranged to:

identify space characters in the input character string, and determine a character sub-string consisting of the terminal character sub-string of the input character string preceding the unrecognized character and succeeding an identified last space character before the unrecognized character.

14. The apparatus of claim 10, wherein the stored character strings are chosen from the following type of character strings: phrases, words, word stubs and frequently used character sequences.

15. The apparatus of claim 10, wherein the apparatus is a mobile terminal.

16. A mobile terminal comprising:

an interface for retrieving handwritten input representing an input character string with an unrecognized character;

a memory for storing frequently occurring character strings; and a processor configured to:

determine at least one character sub-string preceding the unrecognized character in the input character string;

identify, amongst the stored character strings, one or more character strings comprising an initial character sub-string identical to the determined character sub-string preceding the unrecognized character, provide, by means of handwriting recognition, one or more candidate characters for the unrecognized character, identifying one or more character strings that include at least a combination of the determined character sub-string preceding the unrecognized character and one of the one or more candidate characters; and select, based on a next character succeeding the initial character sub-string of each of the one or more candidate character strings, one of the one or more candidate characters which is most likely to be a correct recognition of the unrecognized character, wherein if a complete character string preceding the unrecognized character in the input character string is not identical to any stored character string or an initial sub-string of any stored character string, the processor is configured to determine at least one character sub-string by:

identifying any initial character sub-string of the input character string preceding the unrecognized character, which is identical to one of the stored character strings or to an initial character sub-string of one or more of the stored character strings, and which together with a succeeding character is not identical to any one of the stored character strings or to an initial character sub-string of any one of the stored character strings; and determining a character sub-string consisting of a terminal character sub-string of the input character string preceding the unrecognized character and succeeding any identified initial character sub-string;

else the processor is configured to determine at least one character sub-string by:

determining a character sub-string consisting of said complete character string preceding the unrecognized character in the input character string.

17. The mobile terminal of claim 16, wherein the processor is further arranged to:

identify space characters in the input character string, and to determine a character sub-string consisting of the terminal character sub-string of the input character string preceding the unrecognized character and succeeding an identified last space character before the unrecognized character.

18. The mobile terminal of claim 16, wherein the processor is arranged to determine a character sub-string by:

identifying space characters in the input character string;

identifying any initial character sub-string of the input character string preceding the unrecognized character and succeeding an identified last space character before the unrecognized character, which is identical to one of the stored character strings or to an initial character sub-string of one or more of the stored character strings, and which together with a succeeding character is not identical to any one of the stored character strings or to an initial character sub-string of any one of the stored character strings; and determining a character sub-string consisting of the terminal character sub-string of the input character string preceding the unrecognized character and succeeding any identified initial character sub-string.

* * * * *